US006885866B1

(12) United States Patent
Wikstedt et al.

(10) Patent No.: US 6,885,866 B1
(45) Date of Patent: Apr. 26, 2005

(54) HANDOVER-METHOD IN A CELLULAR RADIO SYSTEM WITH TWO FREQUENCY BANDS

(75) Inventors: Heikki Wikstedt, Oulu (FI); Jukka Peltola, Oulu (FI)

(73) Assignee: Nokia Corporation, Espoo (FI)

( * ) Notice: Subject to any disclaimer, the term of this patent is extended or adjusted under 35 U.S.C. 154(b) by 574 days.

(21) Appl. No.: 09/704,208

(22) Filed: Nov. 1, 2000

Related U.S. Application Data (63) Continuation of application No. PCT/FI99/00566, filed on Jun. 24, 1999.

(30) Foreign Application Priority Data

Jun. 26, 1998 (FI) .................................................. 981486

(51) Int. Cl.[7] ................................................ H04Q 7/20
(52) U.S. Cl. ....................... 455/436; 455/437; 455/438
(58) Field of Search ................................ 455/436, 437, 455/438, 439, 442, 444, 445, 450, 403, 456.2, 434, 515, 552.1, 422.1

(56) References Cited

U.S. PATENT DOCUMENTS

| 5,200,957 | A | * | 4/1993 | Dahlin ........................ 370/331 |
| 5,203,010 | A | * | 4/1993 | Felix et al. .................. 455/438 |
| 5,878,349 | A | * | 3/1999 | Dufour et al. ............... 455/438 |
| 5,960,354 | A | * | 9/1999 | Einola ......................... 455/454 |
| 6,091,962 | A | * | 7/2000 | Bonta .......................... 455/502 |
| 6,285,875 | B1 | * | 9/2001 | Alajoki et al. ............... 455/423 |
| 6,359,867 | B1 | * | 3/2002 | Ali-Vehmas ................ 370/331 |
| 6,393,279 | B1 | * | 5/2002 | Lee ........................... 455/426.1 |
| 6,728,540 | B1 | * | 4/2004 | DeSantis et al. ............ 455/437 |

FOREIGN PATENT DOCUMENTS

| EP | 0719064 | 6/1996 | |
| WO | WO 96/37084 | 11/1996 | |
| WO | WO 98/03031 | 1/1998 | |
| WO | WO 98/15150 | * 4/1998 | ............ H04Q/7/38 |

* cited by examiner

Primary Examiner—Sonny Trinh
(74) Attorney, Agent, or Firm—Squire, Sanders & Dempsey L.L.P.

(57) ABSTRACT

Handover in a cellular radio system having several frequency ranges is problematic e.g. from the viewpoint of network capacity utilization. The invention concerns a handover-method, especially in a cellular radio system having at least two frequency ranges, wherein the broadcasting is transmitted in a first frequency range and handover to a second frequency range is started. The method according to the invention is characterized in that bursts transmitted by the mobile station (MS) and relating to the handover signalling are measured therein at the base transceiver station (BTS), the measurement results are compared with a pre-established criterion and handover is completed only when the criterion is met.

19 Claims, 9 Drawing Sheets

HANDOVER-METHOD IN A CELLULAR RADIO SYSTEM WITH TWO FREQUENCY BANDS

This application is a continuation of international application serial number PCT/FI99/00566, filed 24 Jun. 1999.

FIELD OF THE INVENTION

The invention concerns a handover-method in a cellular radio system, especially in a system of two or more frequency bands, wherein there is only one broadcast channel.

BACKGROUND OF THE INVENTION

Figure 1:
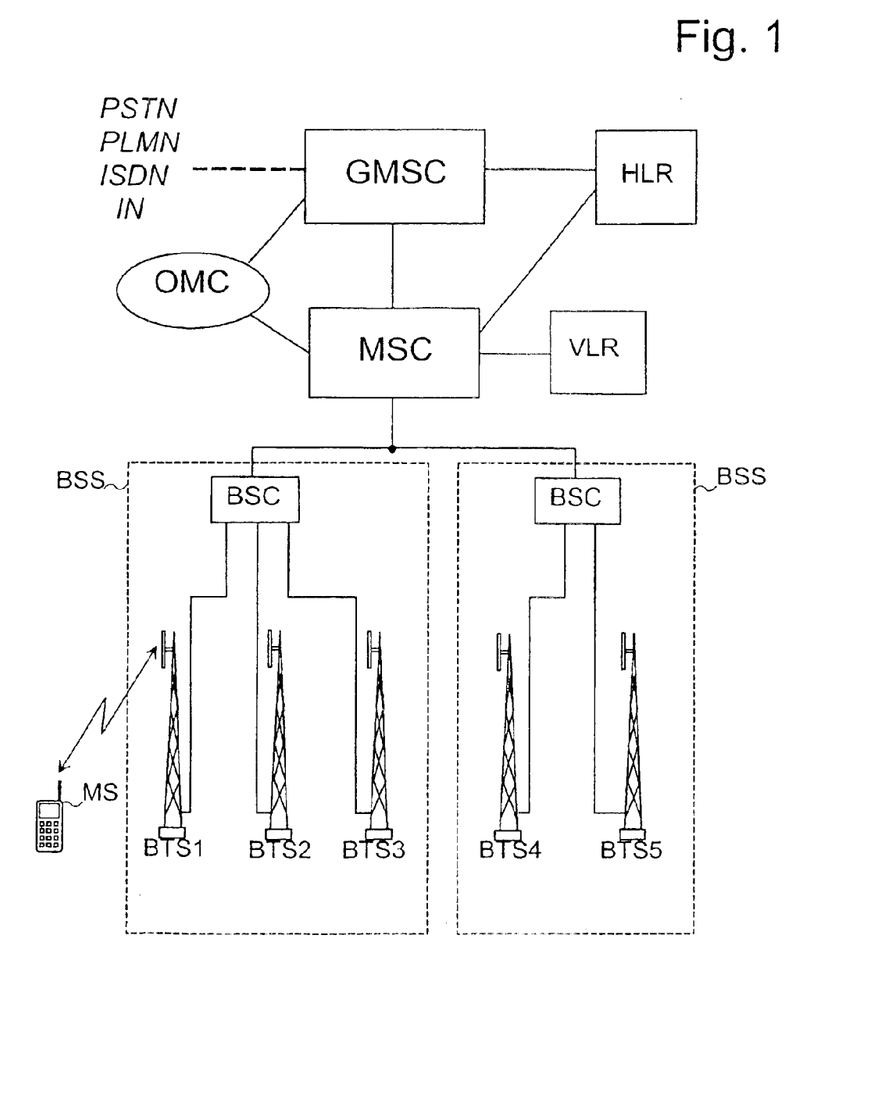
FIG. 1 shows such parts of a mobile communications network which are essential to the invention.

FIG. 1 shows a simplified block diagram of the GSM system (Global System for Mobile communications). Mobile station MS is connected over a radio path with some base transceiver station BTS, in the case shown in FIG. 1 with base transceiver station BTS1. Base Station Subsystem BSS includes Base Station Controller BSC and subordinated base transceiver stations BTS. Several base station controllers BSC are usually subordinated to Mobile Services Switching Centre MSC. Mobile services switching centre MSC is in connection with other mobile services switching centres, and through Gateway Mobile Services Switching Centre GMSC the GSM network is connected with other networks, such as public switched telephone network PSTN, another public land mobile network PLMN, ISDN network or intelligent network IN. The operation of the whole system is monitored by Operation and Maintenance Centre OMC. The subscriber information of mobile station. MS is permanently stored in the system's Home Location Register HLR and it is temporarily stored in that Visitor Location Register VLR, in the area of which mobile station MS is located at each time. Location information of the mobile station is stored in visitor location register VLR with Location Area LA precision. The geographical area monitored by the visitor location register is divided into one or more location areas. One or more base transceiver stations BTS may operate in each location area. Each base transceiver station BTS is constantly transmitting such information on its broadcast channel which is intended for all mobile stations MS and which contains Base Station Identity Code BSIC, location area identifier LAI and information about such frequencies of adjacent base transceiver stations which mobile station MS should measure.

In mobile communications systems of the cellular type, radio coverage is implemented with several radio cells which are located with some mutual overlapping. The mobile station may move freely in the area of the mobile station network and may connect with the best base transceiver station signal available at each time. When the mobile station moves from one cell to another during a call, handover to a new radio cell is performed based on predetermined handover criteria. Handover should be carried out in a way causing the least possible interference with the call going on. To make it possible in a mobile communications system to find out the need for handover and to choose a suitable target cell for the handover, various measurements of connection quality are needed as well as measurements of the field strengths of adjacent cells. Handover is normally caused due to criteria of the radio path, but it can be done also for other reasons, such as e.g. in order to divide the load or to reduce transmission powers. Handover may also be carried out inside the cell from one traffic channel to another.

Mobile station MS is constantly measuring the broadcast channel signals of those base transceiver stations BTS which are located closest to itself, e.g. in order to determine the base transceiver station providing the best signal and to prepare for a possible exchange of cell. Based on the adjacent cell information transmitted by each base transceiver station on its broadcast channel, the mobile station will identify those adjacent cells which it should watch. Mobile station MS regularly transmits the measurement results as a report message through serving base transceiver station BTS1 to base station controller BSC. The report message contains the measurement results of the serving base transceiver station and of no more than the six best adjacent base transceiver stations. Base transceiver station BTS performs signal level and quality measurements of all radio connections going on at the base transceiver station.

Handover from a serving cell to some neighboring cell or to another channel of the serving cell may take place e.g. when measurement results of the mobile station and/or the base transceiver station indicate a low signal level and/or quality in the current channel of the serving cell and a better signal level is available from an ambient cell or a better signal quality can be achieved on another channel, or when some ambient cell/other channel allows communication at lower transmission power levels. The choice of target cell for the handover is influenced e.g. by the signal level and/or load of the target cell. Generally used handover criteria are thus e.g. the signal level and quality of the radio connection, the signal levels of the initial cell and the target cell, the signal level of the initial cell, the transmission power which is demanded of the mobile station and which is permissible for the mobile station in the target cell. Handover from one traffic channel to another is usually carried out when handover criteria established by the operator are fulfilled. It may be necessary to perform handover also due to excessive loading.

Base station controller BSC makes the decisions relating to handover. If the target cell is subordinated to another base station controller BSC, the handover may be done under the control of mobile services switching centre MSC. Handover decisions can also always be made centrally in mobile services switching centre MSC. When required, base station controller BSC gives a handover command through the base transceiver station to mobile station MS.

Figure 2A:
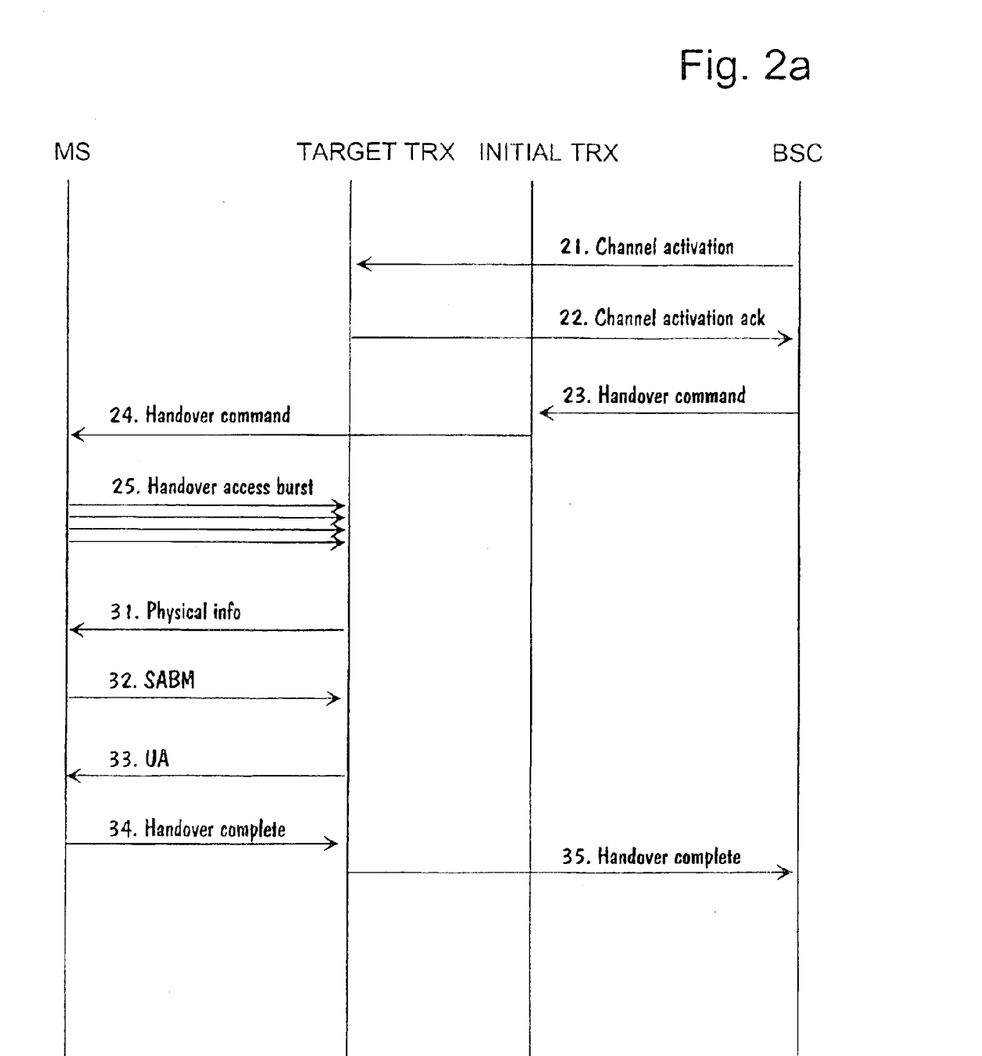
FIGS. 2a–2d show state-of-the-art handover signalling.

FIG. 2a illustrates signalling relayed in handover between transceiver units TRX of two base transceiver stations in the GSM network. In the start-up situation of the handover in FIG. 2a, a radio communication has been set up for mobile station MS, e.g. in order to transmit speech, data or signalling, by way of initial TRX. When base station controller BSC finds that there is a need for handover to a channel of another base transceiver station, base station controller BSC will transmit to target-TRX Channel activation message 21, notifying of the need for handover and requesting target-TRX to assign a radio channel for the mobile station. The target TRX assigns a radio channel for communication and notifies base station controller BSC of this in Channel activation ack message 22. Base station controller BSC transmits the new radio channel information to the initial-TRX of the base transceiver station now to be used in a Handover command (message 23). The base transceiver station transmits the radio channel information to mobile station MS in a Handover command message 24. Mobile station MS carries out the handover by moving over to the new indicated radio channel and transmits to target-TRX a connection request in Handover access burst message 25. Mobile station MS transmits these Handover access burst messages at certain intervals, until it receives a reply from the base transceiver station. Having received the connection request of mobile station MS, the target-TRX transmits to the mobile station an acknowledgement in Physical info message 31, also stating e.g. the timing advance needed by the mobile station for its transmission. Then a link connection is set up between mobile station MS and target-TRX of the new base transceiver station by messages 32 SABM and 33 UA. After the link connection has been set up, mobile station MS transmits to target-TRX an acknowledgement of the successful performance of the handover in Handover complete message 34. The information about successful handover is relayed to base station controller BSC in Handover complete message 35. Mobile station MS continues its communication via the target-TRX. The handover initial-TRX and target-TRX may also be located in the same base transceiver station. If the initial-TRX and the target-TRX are located subordinated to different base station controllers, the signalling will be relayed through mobile services switching centre MSC.

Figure 2B:
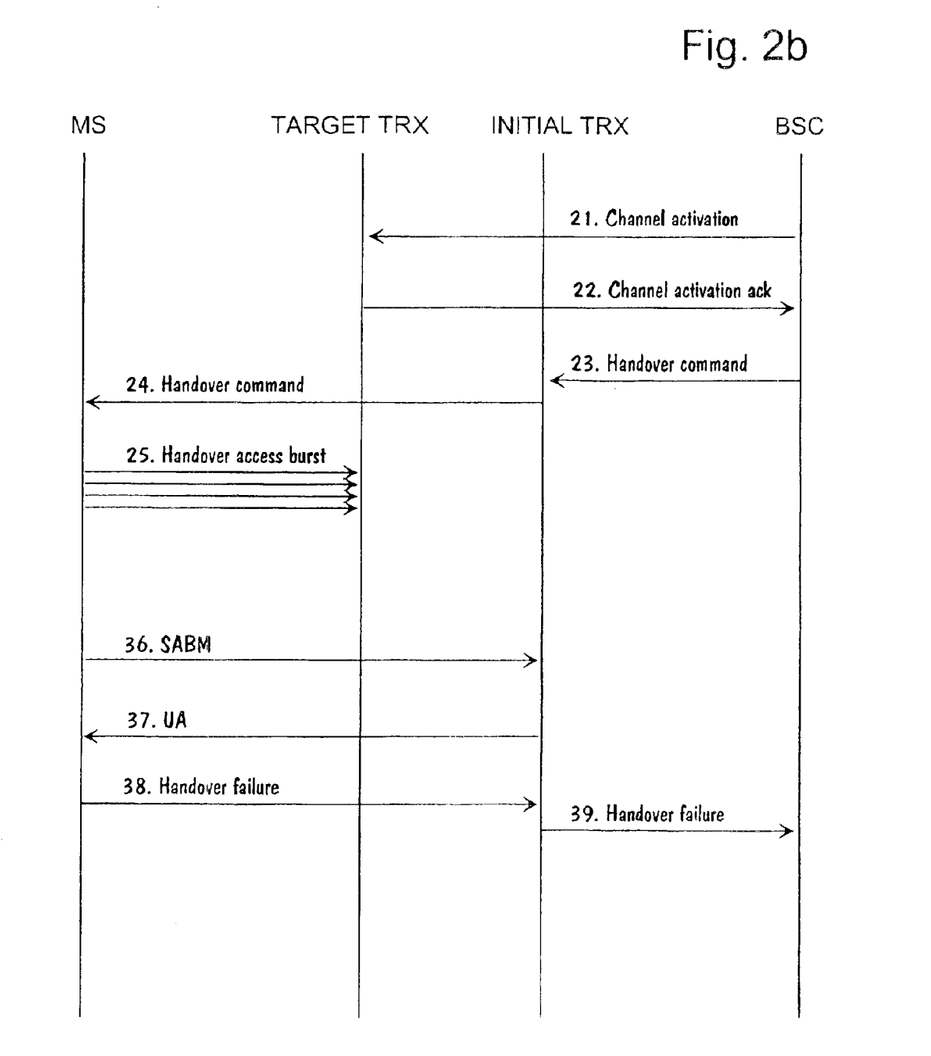

Handover will fail at times due to interference on the radio path. FIG. 2b illustrates signalling in a situation where handover has failed. As regards messages 21–25, the handover begins in the same way as was described earlier in connection with FIG. 2a. However, if mobile station MS receives no reply to its connection requests (messages 25) within a certain time established in advance, after the base transceiver station has failed to receive the connection requests or after the mobile station has failed to receive the base transceiver station's acknowledgement of the connection requests, mobile station MS will return to that channel of the initial-TRX, from which the handover started. A link connection is set up between mobile station MS and the initial-TRX by messages 36 SABM and 37 UA. After the link connection has been set up, mobile station MS transmits to the initial-TRX a message of the failure of the handover in a Handover failure message 38. Information about the handover failure is relayed to base station controller BSC in Handover failure message 39. Mobile station MS continues its communication via the initial-TRX.

Figure 2C:
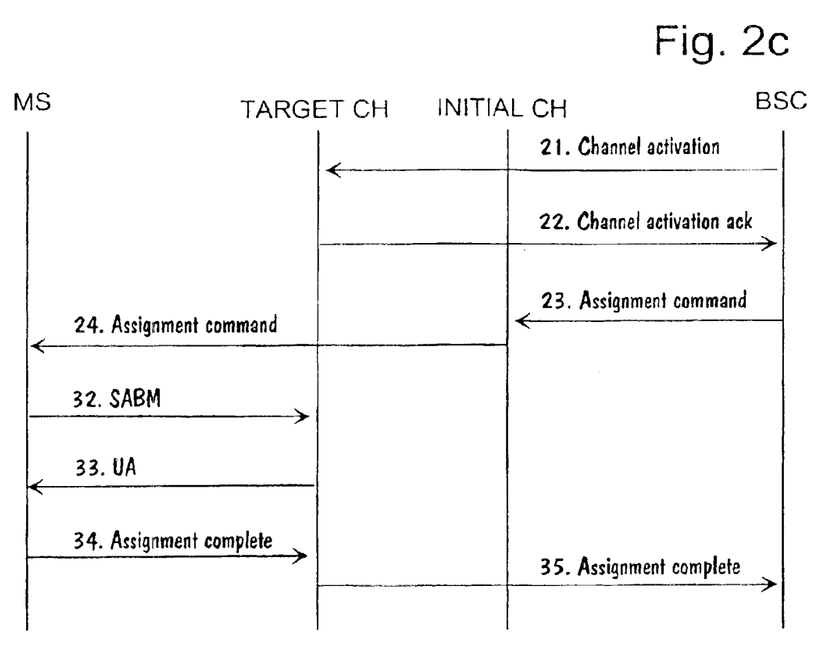

FIG. 2c shows a signalling diagram of handover during a call in handover within a cell from an initial channel to a target channel. When base station controller BSC finds that there is a need for handover, it transmits to the target channel a channel assignment request in a Channel activation message 21 in the same way as was described earlier in connection with FIG. 2a. Also the acknowledgement and the notification of radio channel data in message 22 are transmitted in the way described in connection with FIG. 2a. Base station controller BSC transmits to the initial channel now to be used for communication new radio channel data in Assignment command message 23, which is relayed further to mobile station MS in message 24. After mobile station MS has received the assignment command to a new channel, it transmits on target channel a message 32 to set up a SABM link connection. The base transceiver station acknowledges this with message 33 UA. To complete the handover, the mobile station transmits on the new channel a message of the successful channel assignment in Assignment complete message 34. The base transceiver station relays this information further to the base station controller in Assignment complete message 35.

Figure 2D:
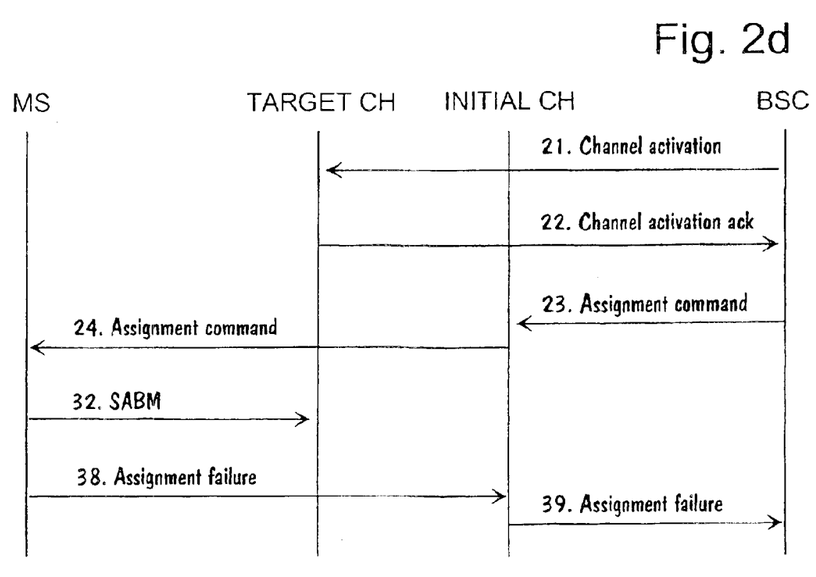

FIG. 2d is a signalling diagram of a failed handover within a cell during a call. Messages 21–24 and 32 are transmitted in the same way as has been described above in connection with FIG. 2c. The handover within the cell fails after the base transceiver station has failed to receive the link connection set up message or after the mobile station has failed to receive the base transceiver station's acknowledgement of the set up of the link connection. Having waited for the reply for a certain time, mobile station MS transmits to the network a message of the failed channel assignment in Assignment failure message 38 on that initial channel from which handover began. The base transceiver station relays the message of the failed channel assignment to base station controller BSC in Assignment failure message 39.

In a mobile communications system implemented with Code Division Multiple Access (CDMA) technology, such handover which is carried out in the ways described above is called hard handover. In addition, CDMA systems use so-called soft handover, where in the course of handover the mobile station may be simultaneously connected with the network through several base transceiver stations. When the signal of some station of these base transceiver stations shows this station to be the best, the mobile station's connections with other base transceiver stations are cut off and the call is continued only through this one base transceiver station which is best. Soft handover prevents handover back and forth between base transceiver stations, when the mobile station is located in a marginal area of the cells.

In cellular radio systems of two different frequency ranges, handover from one frequency range to another is a bit more problematic, especially so when there is only one broadcast channel in the cellular radio system. E.g. in a combination of a GSM system operating in a frequency band of approximately 900 MHz and a DCS system operating in a frequency band of approximately 1800–1900 MHz one broadcast channel can be implemented e.g. in a GSM frequency range. Hereby mobile station MS is able to measure only the base transceiver station signals of the transmission at GSM frequency. Hereby the call set up is always begun from the frequency range of the broadcast signal, because the broadcast is needed for synchronising the mobile station into the network, and during the call handover is attempted to another frequency range. It is known in the case of one broadcast channel to perform handover between GSM and DCS frequencies in two different ways: 1) by setting in the handover criterion a sufficiently high threshold value, which the broadcast signal must meet before handover will be carried out to another frequency range, or 2) by putting in test use a traffic channel of another frequency range, whereby normal uplink and downlink measurements are made on the traffic channel during the call and a new handover is performed back to the first frequency range, if the signal is not good enough. In the second method presented above, the criterion for performing handover to another frequency range may be set as a lower value than in the first method, e.g. as an average value.

It is a problem in state-of-the-art methods of implementing handover, and especially in a cellular radio system of two frequency ranges presented above, in the first method that a safe handover threshold value is uneconomic from the viewpoint of network capacity, whereby it wastes network capacity. Since the range of a base transceiver station signal of a larger frequency range is smaller than the range of a base transceiver station signal of a smaller frequency range and signals of different frequencies will change at a different rate in relation to the distance, the safe handover threshold value must be made even too demanding e.g. as regards handover taking place near the base transceiver station. In addition, such a safe threshold value will prevent full utilisation of another frequency range in the communication. In the second method of implementation presented above, it is a problem that the connection quality will deteriorate in the other frequency range while measurements are performed on the traffic channel, if the radio signals are not good enough after all and a new handover must be performed in order to move the connection back to the first frequency range. The quality of the service will then suffer, as the mobile station is exposed to the poor radio signal.

SUMMARY OF THE INVENTION

The objective of this invention is to bring about a handover-method which saves resources of a cellular radio system, especially in systems of several frequency bands, wherein there is only one broadcast channel.

This objective is achieved with the methods according to the invention, which are characterised by that which is said in the independent claims. Advantageous embodiments of the invention are presented in the dependent claims.

The invention also concerns a mobile communications system and a base transceiver station.

The invention is based on the idea that after handover has started, that signal is measured which is received at the base transceiver station from the mobile station in connection with handover signalling, and handover is allowed to continue only if the mobile station's signal meets a criterion established beforehand. Completion of handover thus depends on the uplink signal received at the base transceiver station. The communication on the connection is not transferred to a new channel, if during handover signalling it is found at the base transceiver station that the mobile station's signal does not meet the established criterion, but hereby the connection is continued on the old channel, from which handover started.

It is an advantage of such a method and mobile communications system implementing the method that the efficiency and capacity of the cellular radio system will increase, when the acceptance of the handover target cell is based on real radio measurements. An improved channel management is thus achieved by the method according to the invention.

Another advantage attained by the handover in accordance with the invention is that network capacity is saved as regards measurements and radio path resources are saved as the channel is not assigned for operation for an unnecessarily long time.

In addition, it is an advantage of handover according to the invention that the quality of service remains good also in connection with handovers.

BRIEF DESCRIPTION OF THE DRAWINGS

The invention will now be described in connection with preferred embodiments and referring to the examples shown in FIGS. 3–8 in the appended drawings, wherein.

DETAILED DESCRIPTION OF THE INVENTION

The present invention can be applied in connection with any kind of mobile communications system. Hereinafter the invention will be described in greater detail by way of example, primarily in connection with the digital GSM-DCS mobile communications system, which operates with two frequency bands. FIG. 1 shows the simplified structure of the GSM network which was described above. As regards a more detailed description of the GSM system, reference is made to the GSM recommendations and to the book "The GSM System for Mobile Communications", M. Mouly & M. Pautet, Palaiseau, France, 1992, ISBN:2–9507190-0-7.

In the following, the invention will be described in greater detail in the light of a first embodiment of the invention and with reference to FIGS. 3–6.

Figure 3:
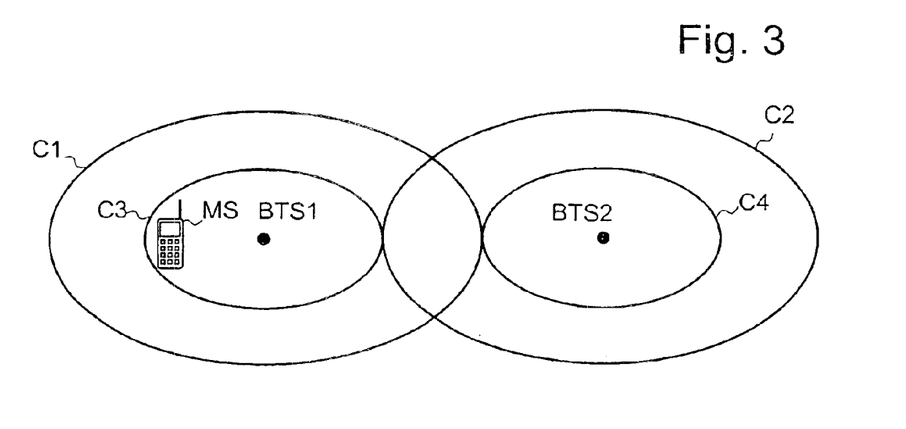
FIG. 3 shows an example of a part of the radio coverage of a cellular radio system having two frequency ranges.

FIG. 3 shows the cellular coverage of two base transceiver stations BTS1 and BTS2 in a cellular radio system having two frequency bands. Cell coverages C1 and C2 represent the GSM cells of the lower frequency range, while cell coverages C3 and C4 represent the DCS cells of the higher frequency range, which have a smaller coverage area than the GSM cells. When mobile station MS is moving in the cellular system during a call or a data transmission, the need for handover of the connection is monitored in a state-of-the-art fashion based on signal measurements supplied by the mobile station to the network and performed by the base transceiver station. E.g. when mobile station MS has reached the area of cell C3, handover is started from the transceiver unit TRX1 of cell C1 to the transceiver unit TRX3 of cell C3 (not shown in the figure). The handover to be performed in accordance with the invention is described more closely in the following referring to the flow chart in FIG. 4.

Figure 4:
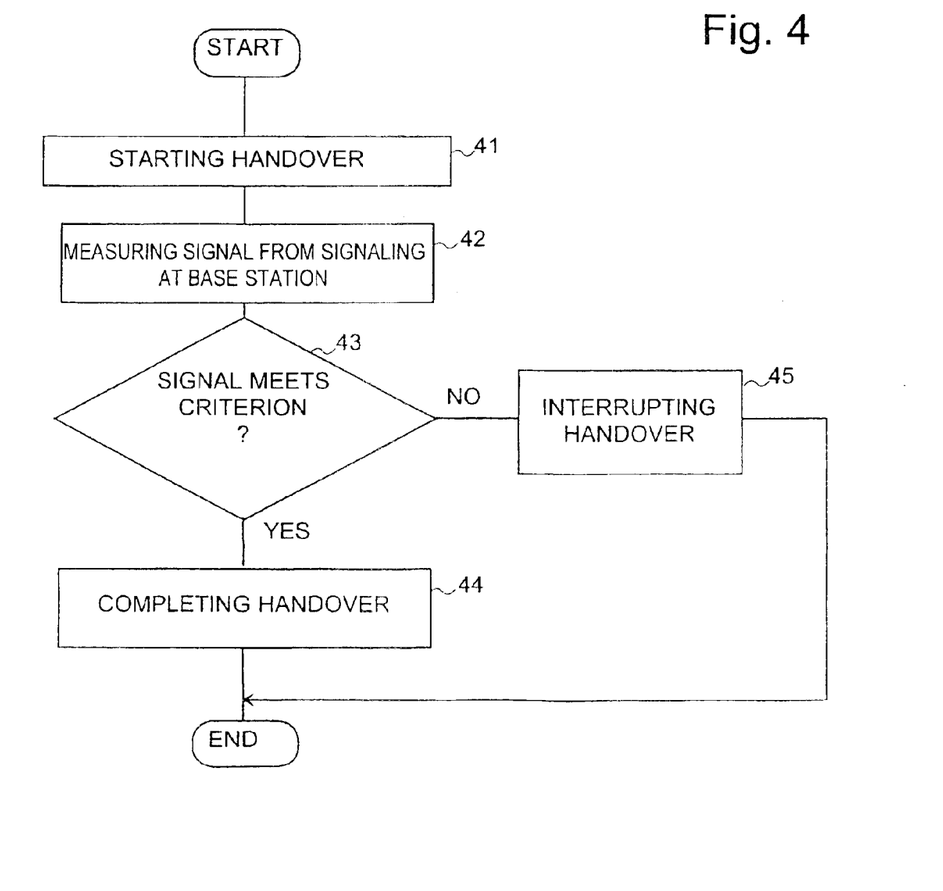
FIG. 4 shows a flow chart of a handover-method in accordance with the invention.

At stage 41 in FIG. 4 handover is started e.g. from a channel of the first frequency range to a channel of the other frequency range, in the case shown as an example in FIG. 3 from the channel of TRX1 to the channel of TRX3. According to the invention, TRX3 measures a signal of the handover signalling transmitted by the mobile station (stage 42) and compares the signal with a pre-established criterion (stage 43). If the signal of mobile station MS meets the established criterion, handover will be continued in a state-of-the-art fashion and the radio connection of the mobile station is transferred for relaying through TRX3 (stage 44). If the signal of mobile station MS does not meet the established criterion, handover is interrupted and relaying of the mobile station's radio connection will continue through TRX1 (stage 45).

Figure 5:
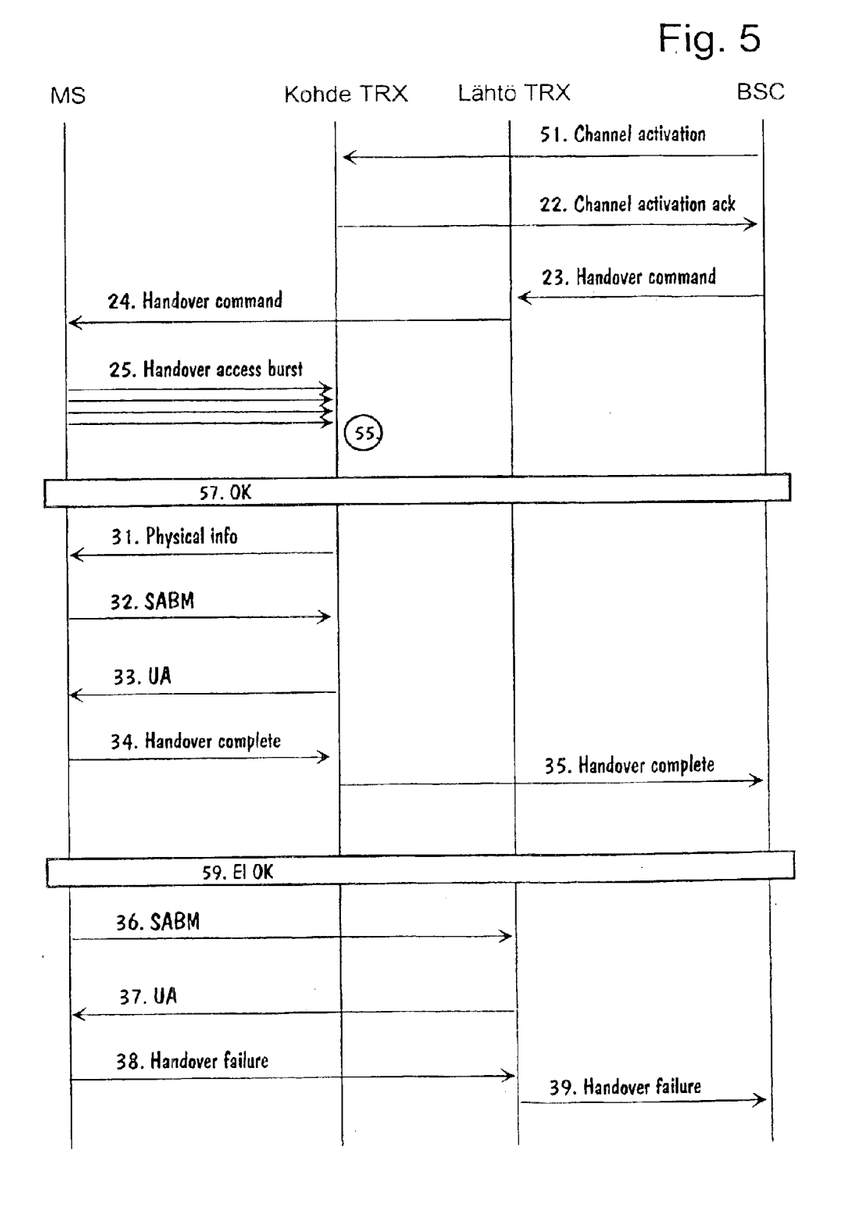
FIG. 5 shows handover signalling in handover between two signals in a first embodiment of the invention.

FIG. 5 is a signalling diagram in greater detail of handover between two cells in accordance with the invention. The initial-TRX preferably uses the frequency range channel of the broadcast channel while the target-TRX uses a channel of the other frequency range. Handover is started in a state-of-the-art fashion when a criterion is fulfilled which is established for handover to be performed from a first frequency range to a second frequency range. Handover begins with base station controller BSC sending to the target-TRX a channel assignment request in a Channel activation message 51. Besides the state-of-the-art information, message 51 may be used in accordance with the invention for relaying to the target-RX the information that the started handover is a conditional handover in accordance with the invention. Message 51 can also be used for supplying to the mobile station's MS signal that criterion, the fulfilment of which is the precondition for continuation of the handover.

Alternatively, the criterion for continued handover may be supplied to the base transceiver station in an O&M procedure. In a state-of-the-art fashion, target-TRX assigns a radio channel for communication and makes this known to base station controller BSC (message 22), which sends the new radio channel information to the initial-TRX (message 23). Further, in a state-of-the-art fashion, the radio channel information is transmitted to mobile station MS. (message 24). Mobile station MS performs the handover by moving over to the new indicated radio channel and it transmits to the target-TRX a state-of-the-art connection request in a Handover access burst message 25. Mobile station MS sends these connection request messages at certain intervals, until it receives a reply from the base transceiver station. In accordance with the present invention, at stage 55 target-TRX measures the radio signal of the Handover access burst message 25 it received from the mobile station. From this radio signal, the base transceiver station measures the value/values required by the criterion established for the signal. According to the invention, the base transceiver station compares the measurement results with the established criterion. If the mobile station signal meets the pre-established criterion, handover will be continued after stage 57 in a state-of-the-art fashion with acknowledgement by the base transceiver station (message 31). Thereupon, the handover signalling is still carried on in a state-of-the-art fashion also as regards messages 32–35. The communication between mobile station MS and the network is continued through the target-TRX. If judging by the measurement performed at stage 55 the mobile station signal does not meet the pre-established criterion, the process according to the invention continues from stage 55 to stage 59 in the signalling diagram. Hereby the base transceiver station will not send any acknowledgement message to the mobile station, so in a state-of-the-art fashion mobile station MS after a certain time sends message 36 to target-TRX to set up a link connection in the same way as in a state-of-the-art situation of failed handover. Messages 37–39 are also similar to a state-of-the-art situation of failed handover. In this situation, the communication will be continued through initial-TRX.

Figure 6:
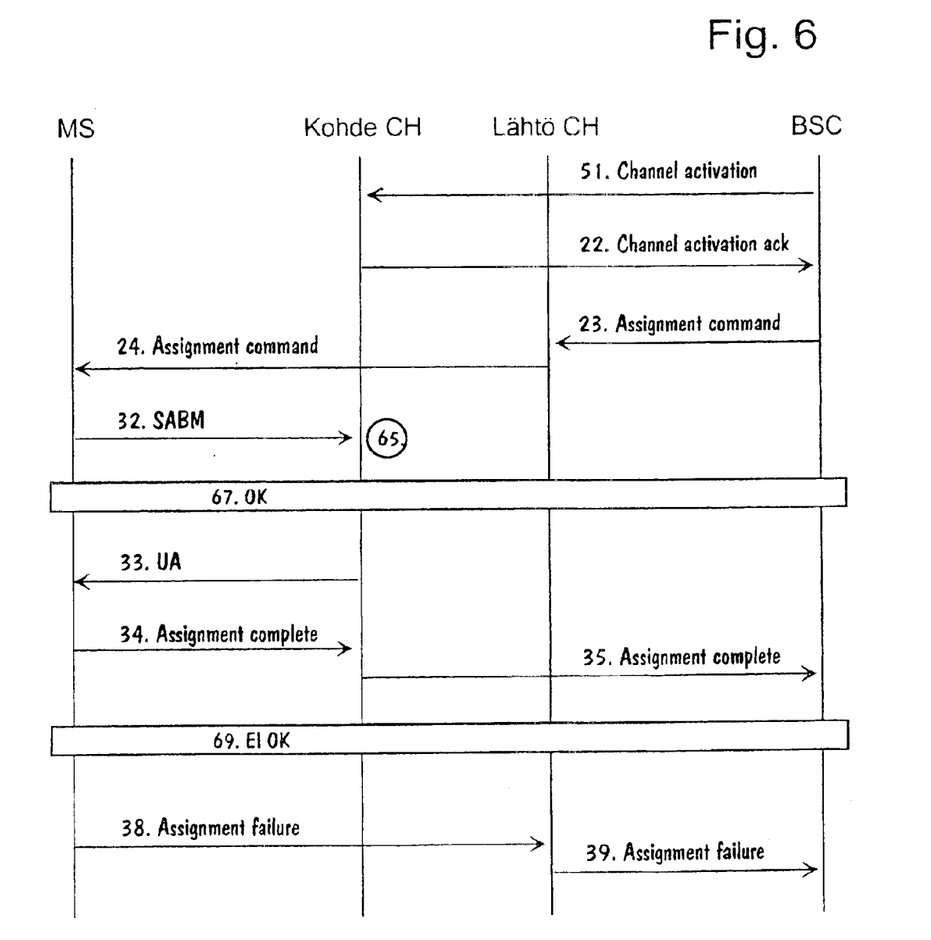
FIG. 6 shows handover signalling in intracellular handover in a first embodiment of the invention.

FIG. 6 is a signalling diagram of handover in accordance with a first embodiment of the invention in intracellular handover from the initial channel to the target channel during a call. When handover has started based on a state-of-the-art criterion, base station controller BSC transmits to the target channel a channel assignment request in a Channel activation message 51, in which it is possible in accordance with the invention to relay the information that the started handover is a conditional handover in accordance with the invention, and preferably also the criterion established for this conditional handover. Alternatively, the criterion for continued handover may be supplied to the base transceiver station in an O&M procedure. In a state-of-the-art fashion, the target channel is assigned for communication with the mobile station, and this is made known to base station controller BSC (message 22), which sends information about the assigned radio channel to the initial channel (message 23). Further, in a state-of-the-art fashion the radio channel information is transmitted to mobile station MS (message 24). Mobile station MS performs the handover, by moving over to the new indicated radio channel and it transmits on the target channel state-of-the-art SABM message 32. In accordance with the present invention, the base transceiver station at stage 65 measures this signal and compares the measurement results with the established criterion. If the signal received from the mobile station meets the established criterion, the handover will be continued from stage 67 with an acknowledgement sent by the base transceiver station in UA message 33. The successful channel assignment is made known in a state-of-the-art fashion in messages 34 and 35. The communication between mobile station and network is continued on the target channel. If the comparison at stage 65 indicates that the signal received from the mobile station does not meet the established criterion, signalling is continued in accordance with the invention after stage 65 from stage 69. Hereby the base transceiver station will not send any acknowledgement signal to the mobile station, and after waiting for a certain time the mobile station will send to the network a message that the channel assignment failed in Assignment failure message 38 on the initial channel from which the handover started. The information about handover failure is transmitted in a state-of-the-art fashion to base station controller BSC in message 39. The communication between mobile station and network is continued on the initial channel. The initial channel and the target channel shown in FIG. 6 are preferably in the second frequency range of the system, where there is no broadcast channel.

Figure 7:
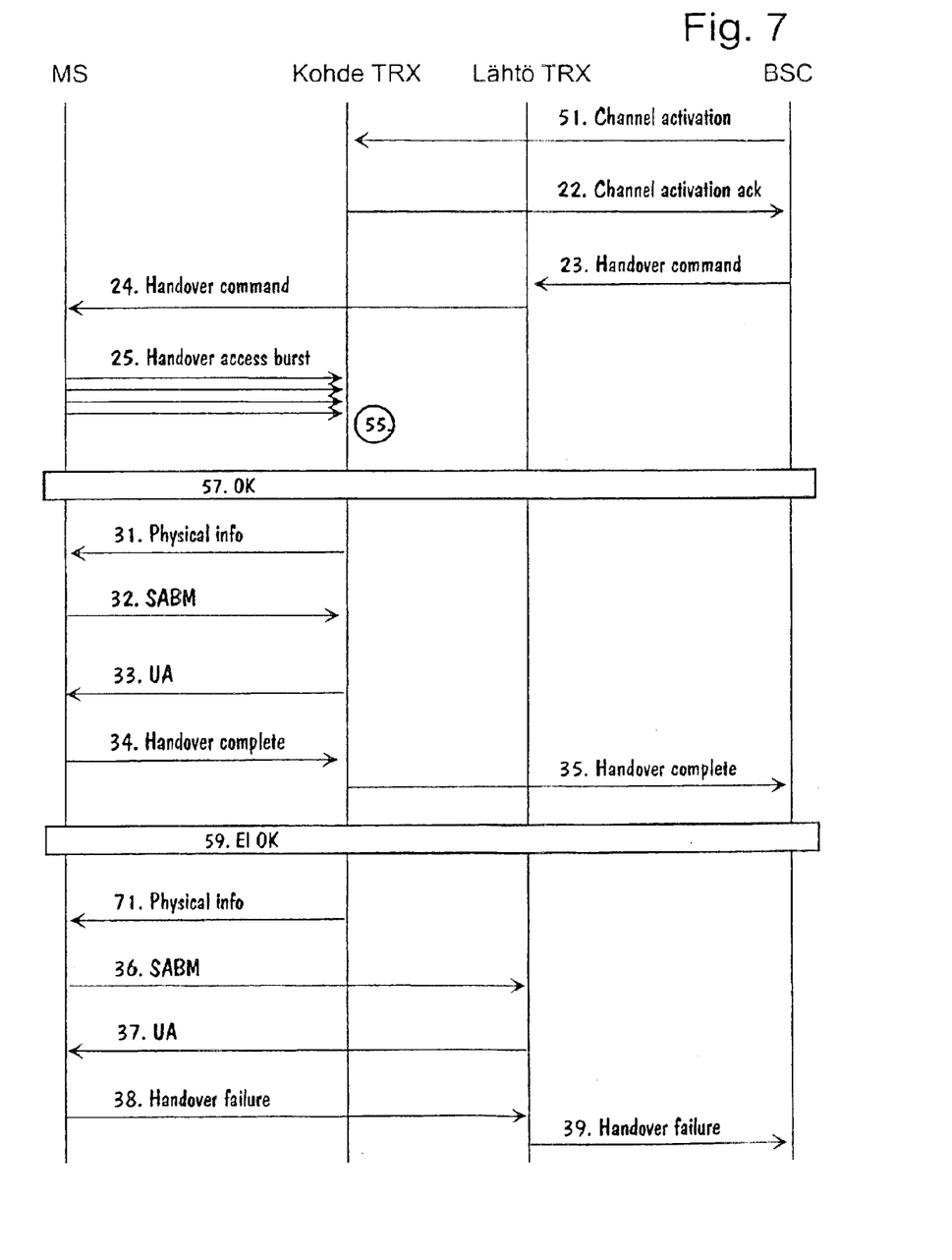
FIG. 7 shows handover signalling in handover between two cells in a second embodiment of the invention.

FIG. 7 shows handover signalling in accordance with a second embodiment of the invention in handover between two cells. This embodiment is otherwise similar to the first embodiment described above in connection with FIG. 5, except as regards the first message after rejection of the handover. In this embodiment, the target-TRX transmits to mobile station MS a message of the handover rejection in Physical info message 71, which is known as such in the art, which is thus in this situation used in a new context and with a new information content. It is an advantage of this embodiment that mobile station MS receives information more quickly about the handover failure and it then knows to go back to its former channel, when the base transceiver station notifies the mobile station of the negative result of measurements and of its comparison in message 71, instead of the mobile station transmitting connection requests and waiting for a certain state-of-the-art time before it finds out that the handover has failed. For this embodiment to work, changes must be made in the network and slight changes must also be made in the mobile station.

Intracellular handover in accordance with the second embodiment of the invention is implemented in a similar manner. Thus, the handover signalling hereby differs from that shown in FIG. 6 only as regards the signalling after a rejected handover (stage 69), so that on the target channel information about rejection of the handover is transmitted to the mobile station in the Physical info message.

The handovers presented above may of course also be implemented between channels subordinated to two different base station controllers BSC. Hereby the handover signalling will travel through mobile services switching centre MSC.

The handover-method according to the invention is also suitable for use in a cellular radio system having one frequency range or otherwise in handovers within the same frequency range, although the greatest benefit is achieved with the invention in a system having several frequency ranges, wherein only one broadcast channel is used. In handovers within one frequency range, the method according to the invention may be used for carrying out a quick handover, e.g. when judging by measurement results the suitability of the target channel is uncertain.

The criterion according to the invention which was presented above and which is established for continued handover may be a fixed criterion established by the operator, a criterion generated as a derivative of radio parameters stored in the network or e.g. a criterion which changes dynamically with the interference level of the network and which will settle at its current value based on idle channel measurements. The established criterion may include one or more threshold values e.g. for the signal level and/or for the signal-to-interference ratio and/or for other suitable state-of-the-art handover criteria.

A mobile communications system implementing the method according to the invention is adapted to start conditional handover, to supply a criterion for the conditional handover to the base transceiver station, to measure the signal of the mobile station's handover signalling at the base transceiver station, to compare the measurement results with a pre-established criterion and to interrupt handover, when it is found as a result of the comparison that the mobile station signal does not meet the pre-established criterion.

Figure 8:
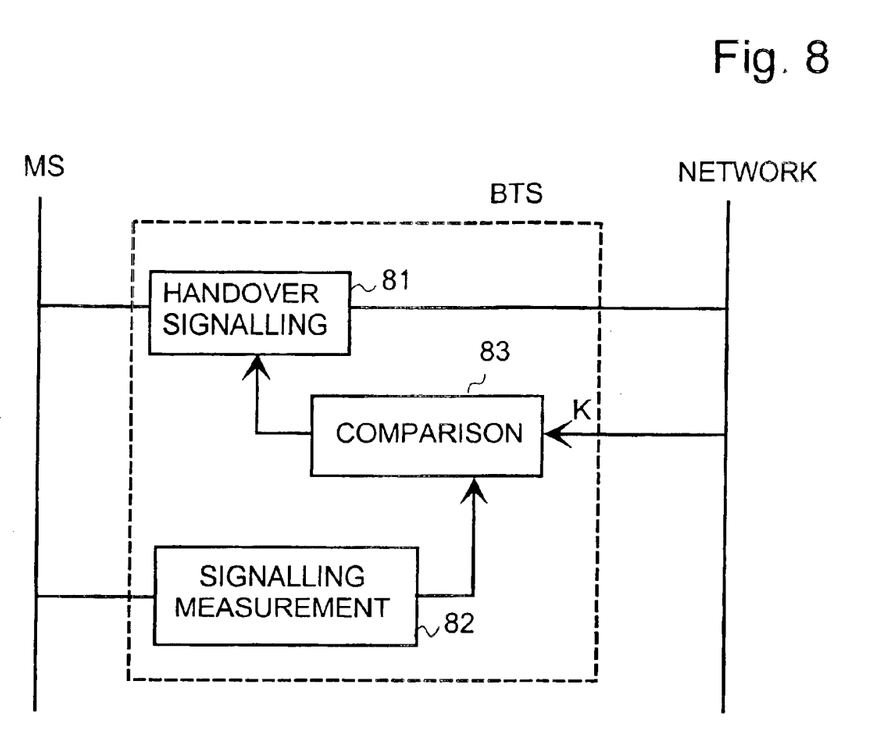
FIG. 8 shows a block diagram of the structure of a base transceiver station according to the invention as regards those parts which are essential to the invention.

FIG. 8 is a block diagram of a base transceiver station according to the invention. The figure shows only those parts which are essential for the invention. The base transceiver station includes state-of-the-art handover-signalling unit 81 for controlling the handover signalling. According to the present invention, the base transceiver station includes signalling measuring means 82 for measuring the signal of the handover signalling received from the mobile station and comparison means 83 for comparing the measurement results of the measuring means with a pre-established criterion K for conditional handover in accordance with the invention. The base transceiver station receives criterion K from elsewhere in the network, e.g. from base station controller BSC. As a result of the comparison performed by comparison means 83, a control signal is obtained for controlling the function of handover-signalling unit 81.

The drawings and the relating explanation are only intended to illustrate the inventive idea. As regards its details the handover according to the invention may vary within the scope of the claims. Although the invention was explained above mainly in connection with a system of the TDMA type, the method may also be used in another kind of cellular radio system, e.g. in a CDMA system and both in hard and soft handover. The invention is suitable for use in all kinds of intracellular handover and handover between cells, wherein there is an initial channel to which the connection can be returned. By handover according to the invention the use of channels of a frequency range without broadcasting is made more effective and the usefulness of internal handovers of such a frequency range is improved. Although the above description of the invention was presented mainly in connection with a cellular radio system having two frequency ranges, the invention is suitable for use also in cellular systems having one frequency range and more than two frequency ranges. The invention is especially advantageous in such cellular radio systems, where the broadcast signal is not implemented on all frequency ranges to be used.

What is claimed is:

1. Handover-method in a cellular radio system including base transceiver stations and mobile stations, in which cellular radio system at least two frequency ranges are used, one of the frequency ranges sending a broadcast signal, wherein the method comprises the steps of:

transmitting by each base transceiver station a broadcast signal intended for all mobile stations in a first frequency range;

starting handover to a second frequency range on which a broadcast signal is not sent;

supplying a criterion for a conditional handover to a base transceiver station relating to the second frequency range;

measuring bursts sent by a mobile station in the second frequency range and relating to the handover signalling at the base transceiver station relating to the second frequency range;

comparing the measurement results with the criterion; and when the criterion is met, completing the handover to the second frequency range.

2. Method as defined in claim 1, wherein the method further comprises the steps of:

interrupting the handover, when the criterion is not met; and continuing the communication between mobile station and network on the initial channel, from which the handover started.

3. Method as defined in claim 2, wherein the method further comprises the step of notifying the mobile station of the handover interruption.

4. Method as defined in claim 1, wherein the method further comprises the step of measuring the signal level of the mobile station's bursts.

5. Method as defined in claim 1, wherein the method further comprises the step of measuring the signal-to-noise ratio of the mobile station's bursts.

6. Method as defined in claim 1, wherein the criterion is transmitted to the base transceiver station in connection with the channel assignment signaling.

7. Method as defined in claim 1, wherein the method further comprises the step of measuring, at the base transceiver station, on a new channel assigned for the connection the bursts of connection request signaling received from the mobile station.

8. Method as defined in claim 1, wherein the method further comprises the step of measuring, at the base transceiver station, the bursts of link connection set up signalling received from the mobile station.

9. Method as defined in claim 1, wherein the first frequency range is a frequency range of a lower frequency than the second frequency range.

10. Handover-method in a cellular radio system including base transceiver stations and mobile stations, wherein the method comprises the steps of:

starting handover from an initial channel, on which a broadcast signal is sent, to a target channel, on which a broadcast signal is not sent;

supplying a criterion for a conditional handover to a base transceiver station relating to the target channel;

measuring bursts transmitted by the mobile station in the target channel and relating to the handover signalling at the base transceiver station relating to the target channel;

comparing the measurement results with the criterion; and when the criterion is met, completing the handover to the target channel.

11. Method as defined in claim 10, wherein the method further comprises the step of:

interrupting the handover, when the criterion is not met; and continuing the communication between the mobile station and the network on the initial channel, from which handover started.

12. Method as defined in claim 11, wherein the method further comprises the step of notifying the mobile station of the handover interruption.

13. Method as defined in claim 10, wherein the method further comprises the step of measuring the signal level of the mobile station's bursts.

14. Method as defined in claim 10, wherein the method further comprises the step of measuring the signal-to-noise ratio of the mobile station's bursts.

15. Method as defined in claim 10, wherein the criterion is transmitted to the base transceiver station in connection with the channel assignment request signaling.

16. Method as defined in claim 10, wherein the method further comprises the step of measuring, at the base transceiver station, on the target channel the bursts of the connection request signalling received from the mobile station are measured at the base transceiver station.

17. Method as defined in claim 10, wherein the method further comprises the step of measuring, at the base transceiver station, the signal of the link connection set up signalling received from the mobile station.

18. Mobile communications system including base transceiver stations and mobile stations, the mobile communications system configured:

to start a conditional handover from a first frequency range, on which a broadcast signal is sent, and to supply a criterion for the conditional handover to a base transceiver station relating to a second frequency range, on which a broadcast signal is not sent;

to measure bursts sent by a mobile station and relating to a handover signalling at the base transceiver station relating to the second frequency range;

to compare the measurement results with the criterion, and to interrupt the handover, when the mobile station signal as a result of the comparison does not meet the criterion.

19. Base transceiver station including a handover-signalling unit for controlling the handover signalling, the base transceiver station relating to a second frequency range, on which a broadcast signal is not sent, the base transceiver station comprising:

receiving means for receiving a criterion for a conditional handover from a base transceiver station sending a broadcast signal in a first frequency range;

measuring means for measuring bursts sent by a mobile station in the second frequency range and relating to the handover signalling; and comparison means for comparing measurement results of the measuring means with the criterion for of the conditional handover, whereby as a result of the comparison a control signal is obtained for the handover-signalling unit.

* * * * *